United States Patent Office 3,715,358
Patented Feb. 6, 1973

3,715,358
METHOD OF TREATING INFLAMMATION
Bruce E. Witzel, Westfield, Conrad P. Dorn, Jr., Plainfield, and Tsung-Ying Shen, Westfield, N.J., assignors to Merck & Co., Inc., Rahway, N.J.
No Drawing. Application Mar. 5, 1970, Ser. No. 16,954, which is a continuation-in-part of abandoned application Ser. No. 687,101, Dec. 1, 1967. Divided and this application May 13, 1971, Ser. No. 143,173
Int. Cl. A61u 27/00
U.S. Cl. 260—263       4 Claims

ABSTRACT OF THE DISCLOSURE

Inflammation in patients can be advantageously treated by administration of 3- or 4-phenylpyridones with or without substituents on the various rings, or alternatively using 3- or 4-phenyl-2-alkoxy.

CROSS-REFERENCES TO RELATED APPLICATIONS

This application is a division of copending U.S. Ser. No. 16,954, filed Mar. 5, 1970, which is a continuation-in-part of U.S. Ser. No. 687,101 filed Dec. 1, 1967, and both now are abandoned.

BACKGROUND, SUMMARY AND DETAILED DESCRIPTION OF INVENTION

This invention relates to a method of treating inflammation. More specifically, this invention relates to a method of treating inflammation which comprises the oral administration to a patient of from 0.5 to 30 mg./kg. of body weight/day of a compound having one of the structures I or II:

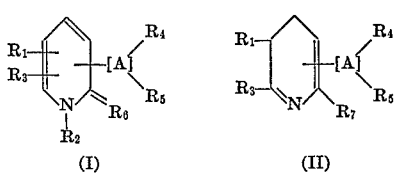

in which $R_1$ is hydrogen,
lower alkyl,
phenyl,
phenyl-lower alkyl,
halogen,
halo-lower-alkyl
lower alkoxy,
amino,
diloweralkylamino,
diloweralkylamino lower alkyl,
nitro,
loweralkylsulfonyl,
phenylsulfonyl,
phenoxy,
sulfo, or
triphenylmethyl;

$R_2$ is hydrogen,
loweralkyl,
loweralkenyl,
hydroxy,
amino,
loweralkynyl,
phenyl,
substituted phenyl,
phenylloweralkyl,
phenylloweralkenyl,
loweralkylamino lower alkyl,
diloweralkylamino lower alkyl,
benzamido,
loweralkanoylamino,
carbobenzoxyamino,
carb-loweralkoxyamino,
benzylidineamino,
phenylureido,
aminoloweralkyl,
loweralkanoyl lower alkyl,
carboxyloweralkyl,
hydroxyloweralkyl,
cyanoloweralkyl;

$R_3$ is hydrogen, or
loweralkyl;

$R_4$ and $R_5$ are the same or different and are hydrogen,
loweralkyl,
phenyl,
halogen,
trihalo-loweralkyl,
loweralkoxy,
amino,
lower-dialkylamino,
nitro,
hydroxy,
cyano,
sulfamoyl,
loweralkyl-sulfamoyl,
diloweralkyl-sulfamoyl,
mercapto,
lower alkylthio,
lower alkylsulfinyl,
lower alkylsulfonyl,
carbamoyl,
carboxy,
sulfo, or
phenylsulfonyl;

$R_6$ is oxygen or sulfur;
$R_7$ is $OR_8$ or $SR_8$;

in which $R_8$ is loweralkanoyl or loweralkyl;

benzyl,
nitrobenzyl,
lower alkylbenzyl,
halobenzyl,
aminobenzyl,
lower alkylaminobenzyl,
lower alkoxybenzyl,
methylenedioxybenzyl;

and [A] is carbocyclic or heterocyclic aryl such as phenyl,
thiazolyl,
thienyl,
pyridyl, or
furyl, and is linked to the 3 or 4 position. More specifically also, this invention relates to certain compounds which are used in the above method.

In the past, a standard treatment of inflammation has been to administer various compounds of the steroid class. These had the great disadvantage of affecting the calcium in the bones after prolonged administration. Recently, certain non-steroid drugs have been introduced which eliminate, to a large extent, this deficiency. However, there still remains the problem of certain other side effects such as haematological disorders and irritations in the gastro intestinal tract. There is, therefore, a need for new compounds for the treatment of inflammation which will further reduce the side effects experienced on chronic administration.

We have found that inflammation can be treated advantageously with the class of compounds known generically as 3- or 4-phenyl-2[1H]-pyridone including the parent compound of each series, namely, 3- or 4-phenyl-2[1H]-pyridone. Treatment of inflammation with this class of compounds shows less side effects than with prior drugs while retaining excellent effectiveness.

This invention further relates to new pyridones. More particularly, the new compounds of this invention are those of the above definition with the added provisos that when $R_1$ is phenyl, $R_3$ is loweralkyl; when $R_1$ is loweralkyl, $R_3$ is hydrogen and when $R_2$ is loweralkyl, $R_1$ is other than hydrogen.

In the most preferred compounds of this invention $R_1$ is hydrogen, loweralkyl, halogen, haloloweralkyl, loweralkoxy, nitro, amino diloweralkylamino, or diloweralkylaminoloweralkyl; $R_2$ is hydrogen, loweralkyl, lowerakenyl, lower alkynyl, hydroxy, amino, loweralkylaminoloweralkyl, diloweralkylaminoloweralkyl, phenyl, phenylloweralkyl or phenylloweralkenyl; $R_3$ is hydrogen or loweralkyl; $R_4$ and $R_5$ each may be hydrogen, loweralkyl, halogen, trihaloloweralkyl, loweralkoxy, nitro, amino, or lowerdialkylamino; $R_6$ is oxygen; and [A] is phenyl, pyridyl, thiazolyl, thienyl or pyridyl.

The preparation of the compounds of this invention are described in the Flow Sheet for 3-phenyl-2[1H]-pyridone compounds. The reactions described operate equally for the 4-phenyl compounds. In general, a 3- or 4-aminopyridine is diazotized in the presence of benzene or a substituted benzene. The resultant 3-phenylpyridine is then oxidized to the corresponding N-oxide. The N-oxide can be converted by one of two methods into the 3-phenyl-2[1H]-pyridone. In the first, the N-oxide is heated with lower alkanoic anhydride which results in the formation by rearrangement of 2-acyloxy 3- or 4-phenylpyridine which upon acid or preferably basic hydrolysis gives the 3- or 4-phenyl-2[1H]-pyridone. Alternatively, the N-oxide is treated with chlorinating agent which again, by rearrangement, produces corresponding 2-chloropyridine which also upon hydrolysis gives the 3- or 4 - phenyl-2[1H]-pyridone. The 2-chloro-3-phenylpyridine oxide is also prepared by direct oxidation of 2-chloro-3-phenylpyridine. The 3- or 4-phenyl-2[1H]-pyridones (Compound VI in the Flow Sheet) may be converted to the corresponding 3- or 4-phenylthiopyridones by treatment with phosphorus pentasulfide. The 3- or 4-phenyl-2[1H]-pyridones of Compound VI may be converted to the 1-substituted 3- or 4-phenyl-2[1H]-pyridones of Compound IX by the action of alkylating agents. Certain other compounds to be used in the method of this invention, namely, the 3-phenylalkoxy or alkylthiopyridines (Compound XI) are prepared from the 2-chloropyridines by use of the sodium alcoholate or thioalcoholate. When 3- or 4-(nitrophenyl)-pyridones are prepared, the nitro group can be reduced to the amino group and this can be used, via a Sandmeyer type reaction, to prepare halo, cyano, mercapto, etc., derivatives.

The Flow Sheet also shows an alternate method of making the 3- or 4-phenyl-2[1H]-pyridones which is the oxidation of the corresponding 3- or 4-phenylpiperidones. It should be noted that the reactions shown in the Flow Sheet are numbered with numbers corresponding to the examples which follow in this specification and which illustrate these reactions.

Other methods have been known in the literature for the preparation of 3- or 4-phenyl-2[1H]-pyridones. A 3- or 4-amino 2-halogenopyridine can be diazotized in the presence of a benzene to get Compound VII, directly, nitro benzenes can be heated with pyridines at very elevated temperatures to produce 3- or 4-phenylpyridines. An open chain substituent on a benzene compound can be cyclized to form the pyridone ring or a piperidone ring which can be oxidized as described above to the 3- or 4-phenyl-2[1H]-pyridone. A 3- or 4-phenylpyridine 2-sulfonic acid, upon fusion with caustic, gives a 3- or 4-phenyl-2[1H]-pyridone. An alpha pyrone can be treated with ammonia to give a 3- or 4-phenyl-2[1H]-pyridone. 3- or 4-phenylpyridines can be hydroxylated directly in the vapor phase. 3- or 4-phenyl 2-aminopyridines can be diazotized and the diazo compound hydrolyzed to give a 3- or 4-phenyl-2[1H]-pyridone. The N-oxides (Compound IV) can be rearranged under the influence of light to give the 3-phenyl-2[1H]-pyridones. The 1-substituted-3- or 4-phenyl-2[1H]-pyridones (Compound IX) can be prepared by the direct oxidation of the corresponding 3- or 4-phenyl N-pyridinium compounds. These various preparations generally are not as practical in the synthesis of these compounds as the ones described in the Flow Sheet, being either highly specialized in what compounds can be used or being methods which give poorer yields or for other inherent weaknesses.

In the treatment of inflammation by 3-phenyl-2[1H]-pyridones, the medicament may be administered orally, intravenously or applied topically. It can be used with any ordinary pharmaceutical carrier. In formulations, it can be pressed into shaped dosage forms, such as pills or tablets, or be encapsulated or dissolved in isotonic solution for I.V. use or made into ointments for topical use. The standard pharmaceutical ingredients normally used in pharmaceutical formulations can be used in formulating these compounds. Inflammation is treated by the administration from 0.5 to 30 milligrams of the compound per kg. body weight per day. An example of the above class is the simple unsubstituted 3-phenyl-2[1H]-pyridone which should be administered in a dosage range of from 2 to 15 mg./kg. of body weight/day. The 3-phenyl-2[1H]-pyridone is effective at 10–30 milligrams per kilogram in rats. The patients used in this treatment may be either animal or human since all warm-blooded species are subject to the ills of inflammation.

FLOW SHEET

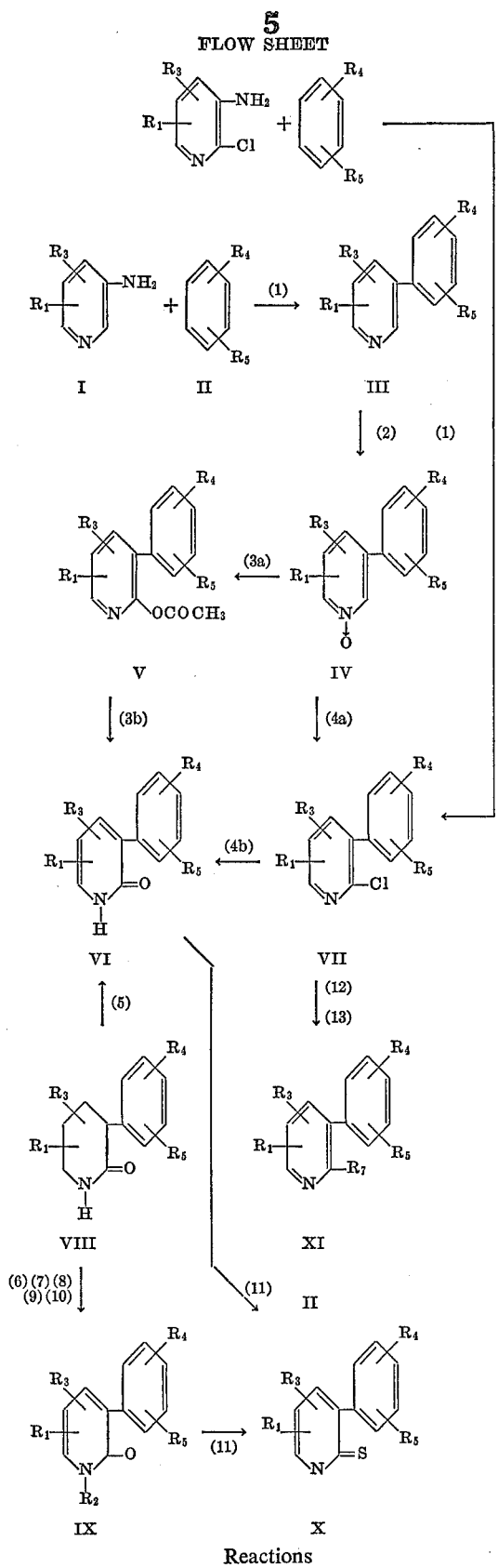

Reactions (1) Addition of or to amyl nitrite with or without an inert solvent, followed by heat. Amyl nitrite can be replaced by other organic solvent-soluble nitrosating agents.

(2) Oxidation in an inert solvent. $H_2O_2$ a preferred agent.

(2a) Oxidation is an inert solvent (e.g. acetic acid) with peracetic acid.

(3)(a) Heating with a lower alkanoic anhydride in an inert atmosphere. Acetic anhydride preferred.

(3)(b) Hydrolysis, usually by contact with water, also in presence of alkali or acid.

(4)(a) Heating with a chlorinating agent, such as $PCl_5$ in an inert solvent.

(4)(b) Hydrolysis, usually by conc. base.

(5) Heating with a dehydrogenating agent such as with palladium-on-charcoal in an inert atmosphere.

(6) Reaction with a strong base, e.g. NaH in an inert atmosphere, followed by addition of an alkylating agent such as an aliphatic tosylate, sulfate or aliphatic halide.

(7) Heating with strong base (e.g., NaOH) and an unsaturated organic compound such as acrylonitrile or an α-halo acid derivative such as chloroacetic acid. (The latter procedure is described in J. Am. Chem. Soc. 71, 1949, p. 390.) 1-carboxymethyl-3-phenyl-2-pyridone, M.P. 93–96° C., may be prepared by this procedure.

(8) Reaction with a strong base such as NaH in an inert atmosphere, followed by heating with iodobenzene or a substituted iodobenzene.

(9) Stirring at low temperatures, preferably cold with an N-halo amino compound.

(10) Heating with an alkanoic acid anhydride, preferably with acetic anhydride at 130–140° C.

(11) Heating with $P_2S_5$ (in the absence of OH, ketone or amino groups in the molecule).

(13) Heating with a metal mercaptide.

Our invention can be illustrated by the following examples.

EXAMPLE 1

(A) 3-aminopyridine (39 g.) in 1.5 l. of anhydrous benzene is treated with amyl nitrite (68 g.) and the resulting mixture heated slowly to 81° C., and kept overnight at this temperature. The solution is decanted from some tar which has precipitated, and the excess benzene removed in vacuo. Distillation of the residue yields 3-phenylpyridine (38 g.; 59%), B.P. 102–105.5° (2.5 mm.) as a yellow oil.

Similarly, when 4-amino pyridine is used in the above example in place of 3-amino pyridine, there is obtained 4-phenylpyridine.

(B) Similarly, when the benzene in Part 1A is replaced by toluene, anisole, benzonitrile, nitrobenzene, fluorobenzene, benzotrifluoride, naphthalene, o-, m-, and p-xylenes, o-, m-, and p-dichlorobenzenes, hydroquinone dimethyl ether, veratrole, resorcinol dimethyl ether, biphenyl, thiophene, furan or thiazole, the corresponding substituted phenylpyridines, 3-(o-, m-, and p-methylphenyl)-pyridines, 3-(o-, m-, and p-methoxyphenyl)-pyridines, 3-(o-, m-, and p-cyanophenyl)-pyridines, 3-(o-, m- and p-nitrophenyl)-pyridines, 3-(o-, m- and p-fluorophenyl)-pyridines, 3-(o-, m- and p-trifluoromethylphenyl)-pyridines, 3-(α- and β-naphthyl)-pyridines, 3-(o,m-, m.p-, o,o'- o,p-, m,m'- and o,m'-dimethylphenyl)-pyridines, 3-(o,m-, m,p-, o,o'-, o,p-, m,m'-, and o,m'-dichlorophenyl)-pyridines, 3-(o,m-, m,p-, o,o'-, o,p-, and m,m'- and o,m'-dimethoxyphenyl)-pyridines, 3-(o-, m,- and p-biphenylyl)-pyridines, 3-(2-thienyl)-pyridines, 3-(2'- and 3'-furyl)-pyridines, and 3-(2'-, 4'- and 5'-thiazolyl)-pyridines are obtained after separation of isomers via fractional distillation and/or column and vapor-phase chromatography.

(C) 3-aminopyridine (39 g.) in 1.5 l. of anhydrous chlorobenzene is treated with amyl nitrite (68 g.) as described in (A) above. Distillation of the concentrated reaction mixture yields 35.4 g. of the three isomers, B.P. 110–130° at ca. 2.5 mm. The fraction boiling 110–113° C. at ca. 2.5 mm. consists of 11.5 g. of nearly one component materials; I.R., N.M.R., U.V. and T.L.C. on this and on products derived from this indicate the o-isomer. The other isomers are isolated from the higher boiling fractions via purification of their picrates, followed by regeneration of the free bases. When 4-aminopyridine is used in place of 3-aminopyridine in the above procedure, the corresponding 4-phenylpyridines are obtained.

(D) In cases where the benzene-substitutes is a solid, an inert co-solvent is used and the amount of benzene-substitute reduced. Also, the phenylpyridines listed in (A) above are obtained by coupling a substituted aniline, as o-chloroaniline, with pyridine via the above procedure, and separating the isomeric α-, β- and γ-pyridines, to give the desired 3-(substituted phenyl)-pyridine.

(E) When 5-amino-2-picoline is used in place of 3-aminopyridine in procedure (A) above, 6-methyl-3-phenyl-pyridine is obtained. Similarly, when 5-amino-3-picoline,
3-amino-4-picoline,
5-amino-2-chloropyridine,
3-amino-5-chloropyridine,
3-amino-4-chloropyridine,
5-amino-2-methoxypyridine,
3-amino-5-methoxypyridine,
3-amino-4-methoxypyridine,
5-amino-2-nitropyridine,
3-amino-5-nitropyridine,
3-amino-4-nitropyridine,
5-amino-2-ethoxypyridine,
3-amino-5-ethoxypyridine,
3-amino-4-ethoxypyridine,
5-amino-2-ethylpyridine,
3-amino-4-ethylpyridine,
5-amino-2-phenethyl,
3-amino-4-phenylethylpyridine,
5-amino-2-fluoropyridine,
5-amino-2-(methylsulfonyl)-pyridine,
3-amino-4-(methylsulfonyl)-pyridine,
5-amino-2-(phenylsulfonyl)-pyridine,
5-amino-3-chloro-2-phenoxy-pyridine,
5-amino-2-methoxy-4-picoline, and
3-amino-5-phenyl-4-picoline are used in place of
3-aminopyridine in the same procedure,
5-methyl-3-phenylpyridine,
4-methyl-3-phenylpyridine,
6-chloro-3-phenylpyridine,
5-chloro-3-phenylpyridine,
4-chloro-3-phenylpyridine,
6-methoxy-3-phenylpyridine,
5-methoxy-3-phenylpyridine,
4-methoxy-3-phenylpyridine,
6-nitro-3-phenylpyridine,
5-nitro-3-phenylpyridine,
4-nitro-3-phenylpyridine,
6-ethoxy-3-phenylpyridine,
5-ethoxy-3-phenylpyridine,
4-ethoxy-3-phenylpyridine,
6-ethyl-3-phenylpyridine,
4-ethyl-3-phenylpyridine,
6-phenethyl-3-phenylpyridine,
4-phenethyl-3-phenylpyridine,
6-fluoro-3-phenylpyridine,
6-methylsulfonyl-3-phenylpyridine,
4-methylsulfonyl-3-phenylpyridine,
6-phenylsulfonyl-3-phenylpyridine,
5-chloro-6-phenoxy-3-phenylpyridine,
6-methoxy-4-methyl-3-phenylpyridine and
3,5-diphenyl-4-methylpyridine are obtained.

(F) When the substituted benzenes of (B) are used in place of benzene in part (E) above, the corresponding substituted phenyl substituted pyridines are obtained.

(G) 3-amino-2-chloropyridine (5.1 g.) in 50 ml. of anhydrous benzene is added dropwise over 32 minutes to 150 ml. of benzene to which has just been added 8 ml. of i-amyl nitrite and which is held at 50–56° C. The mixture is heated to 75° C. over 2 hours and worked up as in part (A) to give 2-chloro-3-phenylpyridine.

(H) Similarly, when the benzene in the above reaction is replaced by pyridine, methylphenylsulfide or any of the benzene substitutes used in part (B), the corresponding 2-chloro-3-arylpyridine is obtained. The products are mixtures of the isomeric arylpyridines and the isomers are separated by fractional distillation and/or column and vapor phase chromatography. In this way, there are obtained 2-chloro-3-(2',3'- and 4'-pyridino)-pyridines,
2-chloro-3-(o-, m- and p-methylthiophenyl)-pyridines,
2-chloro-3-(o-, m- and p-methylphenyl)-pyridines,
2-chloro-3-(o-, m- and p-methoxyphenyl)-pyridines,
2-chloro-3-(o-, m- and p-cyanophenyl)-pyridines,
2-chloro-3-(o-, m- and p-nitrophenyl)-pyridines,
2-chloro-3-(o-, m- and p-fluorophenyl)-pyridines,
2-chloro-3-(o-, m- and p-trifluoromethylphenyl)-pyridines,
2-chloro-3-(α- and β-naphthyl)-pyridines,
2-chloro-3-(o,m-, m,p-, o,o'-, o,p-, m,m'- and o,m'-dimethylphenyl)-pyridines,
2-chloro-3-(o,m-, m,p-, o,o'-, o,p-, m,m'- and o,m'-dichlorophenyl)-pyridines,
2-chloro-3-(o,m-, m,p-, o,o'-, o,p-, m,m'- and o,m'-dimethoxyphenyl)-pyridines,
2-chloro-3-(o-, m- and p-biphenylyl)-pyridines,
2-chloro-3-(2-thienyl)-pyridines,
2-chloro-3-(2- and 3-furyl)-pyridines, and
2-chloro-3-(2'-, 4'- and 5'-thiazolyl)-pyridines.

EXAMPLE 2

(A) 3-o-chlorophenylpyridine (11.4 g.) in 40 ml. of glacial acetic acid is treated at 27° C. with 7 ml. of 30% hydrogen peroxide solution. The mixture is heated gently, in this case 75±2° is preferred and kept overnight, during which time another 9 ml. of hydrogen peroxide is added in 6 cc. and 3 ml. portions. After cooling, solid sodium bisulfite is added in small portions as needed to destroy the excess peroxide, the mixture is concentrated to ca. one-half the volume, 75 ml. of water is added, the mixture concentrated to ca. one-third the original volume, 100 ml. of water added, and the mixture concentrated to dryness. The oil remaining is dissolved in 150 ml. of chloroform, solid anhydrous sodium carbonate is added until the mixture is basic to pH paper, the mixture is filtered, the chloroform solution boiled down to ca. 45 ml. and petroleum ether slowly added, with swirling of the chloroform solution to a volume of ca. 250 ml. The white solid that precipitates is filtered, washed with petroleum ether and dried to give 8.4 g. 3-o-chlorophenylpyridine-N-oxide, M.P. 118–123°, I.R. 8.26μ. This material is used without further purification in part 3B.

(B) Similarly, when the 3-o-chlorophenylpyridine in the above reaction is replaced by the other 3- or 4-phenyl-pyridines prepared in Example 1, the corresponding N-oxides are obtained.

(C) Similarly, when 4-phenylpyridine, 4-(p-tolyl)-pyridine, 4-(i-propylphenyl)-pyridine, 4-(3-biphenylyl)-pyridine, 4-(p-chlorophenyl)-pyridine, 4-(p-bromophenyl)-pyridine, 4-(o-methoxyphenyl)-pyridine, 4-(m-methoxyphenyl)-pyridine, 4-(p-methoxyphenyl)-pyridine, 4-(p-ethoxyphenyl)-pyridine, 4-(p-, m- or p-nitrophenyl)-pyridine, are used in the procedure of part (A), the corresponding 4-phenylpyridine oxides are obtained.

EXAMPLE 3

(A) 3-phenylpyridine-N-oxide (9.2 g.) and 25 ml. of acetic anhydride are heated in an oil-bath to 153° C. (bath temperature), under a nitrogen atmosphere, the stirred mixture kept eleven hours at this temperature, allowed to cool to room temperature, and the dark mixture added slowly to a stirred ice-water mixture (250 ml.) covered with ca. 50 ml. of ether. After solidification of the oily mixture occurs, the solid is filtered, washed well with water and ether, and dried to give 7.7 g. of tan, nearly pure solid. Recrystallization from dimethylsulfoxide followed by recrystallization from chloroform (darco)

yields white crystals, M.P. 225–227° C., of 3-phenyl-2[1H]-pyridone.

(B) 3-(o-chlorophenyl)-pyridine-N-oxide (4.1 g.) and acetic anhydride (10 ml.) are heated, under nitrogen, in an oil bath to 146±2° (bath temperature) and maintained on this temperature for ca. eleven hours. On cooling, the mixture is added to a stirred ice-water mixture (80 ml.), and the resultant oil taken up in chloroform. The chloroform is removed in vacuo, the residue dissolved in 60 ml. methanol, 7 ml. water and 2 ml. saturated aqueous sodium bicarbonate added, the mixture refluxed ca. 15 minutes, the mixture made neutral with 2.5 N hydrochloric acid, the solvents removed, and the residue partitioned between chloroform-water. The chloroform layer is dried, stripped of solvent, and the residue recrystallized from benzene to yield 635 mg. white 3-(o-chlorophenyl)-2-[1H]-pyridone, M.P. 203.5–207°.

(C) Alternately, the acetic anhydride may be stripped in vacuo directly and the methanol-bicarbonate treatment used immediately.

(D) When the substituted pyridine oxides from Example 2 are used in place of 3-(o-chlorophenyl)-pyridine oxide in the above reaction, the corresponding 2-[1H]-pyridones:

3-(o-, m- and p-methylphenyl)-2[1H]-pyridines,
3-(m- and p-chlorophenyl)-2[1H]-pyridones,
3-(o-, m- and p-methoxyphenyl)-2[1H]-pyridones,
3-(o-, m- and p-cyanophenyl)-2[1H]-pyridones,
3-(o-, m- and p-nitrophenyl)-2[1H]-pyridones,
3-(o-, m- and p-fluorophenyl)-2[1H]-pyridones,
3-(o-, m- and p-trifluoromethylphenyl)-2[1H]-pyridones,
3-α- and β-naphthyl-2[1H]-pyridones,
3-(o,m-dimethylphenyl)-2[1H]-pyridone,
3-(m,p-dimethylphenyl)-2[1H]-pyridone,
3-(o,o'-dimethylphenyl)-2[1H]-pyridone,
3-(o,p-dimethylphenyl)-2[1H]-pyridone,
3-(m,m'-dimethylphenyl)-2[1H]-pyridone,
3-(o,m'-dimethylphenyl)-2[1H]-pyridone, the corresponding dichloro and dimethoxy phenyl pyridones, 3-(o-, m- and p-biphenylyl)-2[1H]-pyridones,
3-(2'-thienyl)-2[1H]-pyridone,
3-(2'-furyl)-2[1H]-pyridone,
3-(3'-furyl)-2[1H]-pyridone,
3-(2'-thiazolyl)-2[1H]-pyridone,
3-(4'-thiazolyl)-2[1H]-pyridone,
3-(5'-thiazolyl)-2[1H]-pyridone,
6-methyl-3-phenyl-2[1H]-pyridone,
5-methyl-3-phenyl-2[1H]-pyridone,
4-methyl-3-phenyl-2[1H]-pyridone,
6,5- and 4-chloro-3-phenyl-2[1H]-pyridones,
6,5- and 4-methoxy-3-phenyl-2[1H]-pyridones,
6,5- and 4-nitro-3-phenyl-2[1H]-pyridones,
6,5- and 4-ethoxy-3-phenyl-2[1H]-pyridones,
6- and 4-ethyl-3-phenyl-2[1H]-pyridones,
6- and 4-phenethyl-3-phenyl-2[1H]-pyridones,
6-fluoro-3-phenyl-2[1H]-pyridone,
6- and 4-methylsulfonyl-3-phenyl-2[1H]-pyridones,
6-phenylsulfonyl-3-phenyl-2[1H]-pyridone,
5-chloro-6-phenoxy-3-phenyl-2[1H]-pyridone,
6-methoxy-4-methyl-3-phenyl-2[1H]-pyridone,
4-methyl-3,5-diphenyl-2[1H]-pyridone, and the corresponding 4-substituted-phenyl derivatives of the above compounds are obtained.

(E) In the above cases, the inductive effects of the substituents on the phenyl and pyridine rings help determine the course of the rearrangement, and in some cases some of the corresponding 5-phenyl-2[1H]-pyridones are obtained. The isomers are separated by recrystallization and column chromatography techniques.

EXAMPLE 4

(A) 2-methyl-5-phenylpyridine-N-oxide (1 g.), phosphorous pentachloride (1.2 g.) and dry chloroform (10 ml.) are refluxed on the water-bath for 1 hour. Ice is added to the cooled solution, which is then basified with potassium carbonate. The chloroform layer is separated, dried ($CaCl_2$), and concentrated to yield crude 2-chloro-3-phenyl-6-methylpyridine.

(B) Basic hydrolysis of this compound yields 6-methyl-3-phenyl-2[1H]-pyridone.

EXAMPLE 5

3-phenyl-3,4,5,6-tetrahydro-2-pyridone (1 g.) and 30% Pd/C (0.5 g.) are mixed intimately, covered with a nitrogen atmosphere and placed in a metal-bath set at 270° C. The mixture is kept 8 hours, cooled, the residue extracted several times with boiling chloroform, the solvent removed and the residue chromatographed on a silica gel column using an acetone-ether (v./v. 0–50%) system as eluent, yielding 3-phenyl-2[1H]-pyridone.

EXAMPLE 6

1-methyl-3-phenyl-2[1H]-pyridone (A) To a stirred suspension of 0.87 gram of 50% NaH (0.018 m.) is added at 5° under nitrogen 3.08 grams (0.018 m.) of 3-phenyl-2[1H]-pyridone. The reaction allowed to stir for ½ hour at room temperature and is then cooled to 5° and 2.84 grams (0.020 m. of methyl iodide is added. The reaction mixture is stirred for 3 hours at room temperature and is then concentrated in vacuo. The residue is extracted between methylene chloride and water containing a little hydrochloric acid. The combined methylene chloride extracts are dried over sodium sulfate and concentrated. The residue is recrystallized from methylene chloride and hexane to give 1.9 grams of 1-methyl-3-phenyl-2[1H]-pyridone, M.P. 135–7°.

(B) Similarly, when other alkyl halides such as ethyl bromide, butyl bromide, propyl bromide, etc., are used in place of methyl iodide in the above example, the corresponding 1 - alkyl - 3 - phenyl - 2[1H] - pyridones are obtained.

(C) Similarly, when allyl bromide, methallyl-chloride and crotyl chloride are used in place of methyl iodide in the above example, there is obtained 1-allyl-3-phenyl-2-[1H]-pyridone, 1-(methallyl)-3-phenyl-2[1H] - pyridone and 1-crotyl-3-phenyl-2[1H]-pyridone.

(D) When benzyl chloride, o-chlorobenzyl chloride, m-chlorobenzyl chloride, p-chlorobenzyl chloride, o-methylbenzyl chloride, m-methylbenzyl chloride, p-methylbenzyl chloride, o-fluorobenzyl chloride, m-fluorobenzyl chloride, p-fluorobenzyl chloride, o-methoxybenzyl chloride, m-methoxybenzyl chloride, p-methoxybenzyl chloride, pentafluorobenzyl bromide, 3,4-dichlorobenzyl chloride or 3,4-dimethoxybenzyl chloride is used in place of methyl iodide, the corresponding 1-arylmethyl-3-phenyl-2[1H]-pyridones are obtained.

(E) When cinnamyl bromide is used in place of methyl iodide, there is obtained 1-cinnamyl-3-phenyl-2[1H]-pyridone.

(F) When propargyl bromide is used in place of methyl iodide, there is obtained 1-propargyl-3-phenyl-2-[1H]-pyridone.

(G) When methyl iodide is replaced in the above procedure by 2-chloroethylamine, N-methyl - 2 - chloroethylamine, N,N-dimethyl-2-chloroethylamine, N-ethyl-2-chloroethylamine, N,N-diethyl-2-chloroethylamine, N-(2-chloroethyl)-piperidine or 3-chloropropylamine, the corresponding 1-substituted - 3 - phenyl - 2[1H] - pyridone is obtained.

(H) When methyl iodide is replaced with chloracetone, 1-chloropropan-2-one and phenacyl chloride in the above procedure, the corresponding 1-acylmethyl-3-phenyl-2-[1H]-pyridone is obtained.

(I) When methyl iodide is replaced with 2-bromoethanol or 2-bromopropanol in the above procedure, the corresponding 1-hydroxyalkyl-pyridone is obtained.

EXAMPLE 7

A mixture of 0.02 mole of 3-phenyl-2[1H]-pyridone and 0.02 mole of acrylonitrile is warmed with 0.1 gram of solid sodium hydroxide on a steam bath until reaction occurs. When the exothermic reaction subsides, the reaction mixture is heated on the steam bath for one hour, then cooled. The residue is taken up in chloroform, washed with water and the chloroform extract dried over sodium sulfate and concentrated. Chromatography of the residue on 400 grams of silica gel and elution with ether-petroleum ether (0–70%) gives 1-(2-cyanoethyl)-3-phenyl-2[1H]-pyridone.

EXAMPLE 8

(A) Sodium 3-phenyl-pyridone.—To a suspension of 0.87 gram of 50% NaH (0.018 m.) in 100 mls. of dry benzene is added 3.08 grams (0.018 m.) of 3-phenyl-2-[1H]-pyridone. The reaction mixture is heated at 35° C. for 6 hours and allowed to stir at room temperature overnight. The benzene was then evaporated in vacuo leaving a residue of sodium 3-phenyl-pyridone.

(B) 1,3-diphenyl - 2[1H] - pyridone.—The sodium 3-phenyl-pyridone from above (0.018 m.), 6.04 grams of iodo benzene (0.032 m.) and 0.19 gram of copper (0.003 m.) are mixed with mechanical stirring and heated at 155° under nitrogen for six hours. The reaction mixture is allowed to cool to room temperature overnight and the mixture then extracted well with chloroform. The chloroform extracts are washed with water, dried over sodium sulfate and concentrated. Chromatography of the residue on 500 grams of silica gel and elution with ether-petroleum ether (0–75%) gives 1,3 - diphenyl - 2[1H]-pyridone.

(C) Similarly, when substituted iodo benzenes, ex. 2-iodonitrobenzene, 3-iodonitrobenzene-4-iodinitrobenzene are used in place of iodo benzene in the above example, the corresponding 1-(substituted aryl)-3-phenyl-2[1H]-pyridones are obtained.

EXAMPLE 9

3-phenyl-1-(2'-quinolyl)-2[1H]-pyridone (A) 2-bromo-3-phenyl-pyridine.—A mixture of 0.1 mole of 3-phenyl-2[1H]-pyridone and 0.15 mole of phosphorous tribromide are heated for 3 hours at 180°. The reaction mixture is cooled, decomposed in ice water, made alkaline with sodium hydroxide and extracted well with ether. The combined ether extracts are dried over sodium sulfate and concentrated in vacuo to yield 2-bromo-3-phenyl-pyridine.

(B) 3-phenyl-1-(2'-quinolyl) - 2[1H] - pyridone.—A mixture of 0.02 mole of quinoline-N-oxide and 0.022 mole of 2-bromo-3-phenyl-pyridine are heated on the steam bath for 8 hours. The reaction mixture is cooled, taken up in water containing a little hydrochloric acid and washed with ether. The aqueous layer is made alkaline with potassium carbonate solution and extracted well with chloroform. The combined chloroform extracts are dried over potassium carbonate and concentrated to yield 3-phenyl-1-(2'-quinolyl)-2[1H]-pyridone.

(C) Similarly, when 2-picoline-N-oxide, 3-picoline-N-oxide or 4-picoline-N-oxide is used in place of quinoline-N-oxide in the above procedure, there is obtained 3-phenyl-1-[2'-(6'-methylpyridyl)]-2[1H]-pyridone,
3-phenyl-1-[2'-(5'-methylpyridyl)]-2[1H]-pyridone, and
3-phenyl-1-[2'-(4'-methylpyridyl)]-2[1H]-pyridone.

EXAMPLE 10

A solution of chloramine is prepared by treating at 0° C. 65 ml. of a 1.93 m. neutral sodium hypochlorite solution (0.125 m.) with 20 mls. of 1.84 m. NH$_4$OH (0.375 m.). The above mixture is allowed to stand for one hour in an ice-salt bath and then 0.125 m. of sodium 3-phenyl-pyridone is added. The reaction mixture is stirred overnight at 0–10° C. and is then continuously extracted with ether for 24 hours. The ether extracts are dried over sodium sulfate and concentrated to yield 1-amino-3-phenyl-2[1H]-pyridone.

EXAMPLE 11

1-hydroxy-3-phenyl-2[1H]-pyridone (A) 2-chloro-3-phenyl-pyridine-N-oxide.—0.2 mole of 2-chloro-3-phenyl-pyridine is treated with 25 mls. of glacial acetic acid and 22 ml. of 40% peracetic acid. The temperature of the reaction mixture is kept at 70° C. for 3 hours. The reaction mixture is concentrated, extracted with chloroform and the chloroform extracts concentrated to yield 2-chloro-3-phenylpyridine-N-oxide.

(B) 0.01 mole of 2-chloro-3-phenyl-pyridine-N-oxide and 20 mls. of acetic anhydride are heated for 3 hours at 130–140°. The reaction mixture is then concentrated in vacuo to yield crude 1-hydroxy-3-phenyl-2[1H]-pyridone.

EXAMPLE 12

(A) A mixture of 0.02 mole of 3 - phenyl - 2[1H]-pyridone and 0.025 mole of phosphorus pentasulfide is heated for 6 hours at 160° C. The reaction mixture is then poured into 100 ml. of hot water, cooled and the 3-phenyl-2-[1H]-thiopyridone collected by filtration. Chromatography on 400 gm. of silica gel and elution with ether-petroleum ether (0–90%) gives 3-phenyl-2[1H]-thiopyridone, M.P. 229–237°.

(B) Similarly, when the other substituted pyridines are used in place of 3-phenyl-2[1H]-pyridone in the above example, the corresponding 2[1H]-thiopyridones are obtained.

EXAMPLE 13

(A) 2-methoxy-3-phenyl-pyridine

A mixture of 0.01 mole of 2-chloro-3-phenyl-pyridine, 0.01 mole of sodium methoxide and 50 cc. of dry dimethylformamide are heated at 60° for 2 hours. The reaction mixture is concentrated in vacuo, taken up in chloroform and washed with water. The chloroform extract is dried over sodium sulfate and concentrated. The residue is chromatographed on 250 gms. of silica gel. Elution with ether-petroleum ether (0–75%) gives 2-methoxy-3-phenylpyridine.

(B) Similarly, when the other substituted 2-chloro-3-phenyl-pyridines are used in place of 2-chloro-3-phenyl-pyridine, the corresponding 2-methoxy phenylpyridines are obtained. When other alkoxides such as sodium ethoxide or propoxide, sodium phenolate, sodium o- or p-chlorophenolate or p-methoxyphenolate, sodium alloxide, crotoxide, or methalloxide, sodium propargoxide, sodium benzoxide, chlorbenzoxide or methoxybenzoxide, sodium cinnamoxide, sodium 2-aminoethoxide, 2-amino-propoxide, 2-dimethylaminoethoxide, 3-dimethylaminopropoxide, methylaminoethoxide or sodium methoxyethoxide or ethoxypropoxide are used in place of sodium methoxide, such as in the above example, the corresponding alkoxyphenylpyridines are obtained. The alkoxides are prepared by adding 0.01 mole of the alcohol in 20 cc. dry DMF to 0.01 mole of NaH in 30 cc. dry DMF, and stirring 1 hour.

EXAMPLE 14

The procedure of Example 13 is followed except that sodium methyl mercaptide is used instead of sodium methoxide. There is obtained the corresponding 2-methylthio-3-phenyl-pyridine. When other mercaptides such as the sodium salts of benzylmercaptan, o-nitrobenzylmercaptan,
m-nitrobenzylmercaptan,
o-methylbenzylmercaptan,
m-methylbenzylmercaptan,
p-metylbenylmercaptan,
2,4-dimethylbenzylmercaptan,
3,4-dimethylbenzylmercaptan,
o-chlorobenzylmercaptan,
m-chlorobenzylmercaptan,
p-chlorobenzylmercaptan,
2,4-dichlorobenzylmercaptan,
3,4-dichlorobenzylmercaptan,
2,4,5-trichlorobenzylmercaptan,
2-chloro-5-nitrobenzylmercaptan,
5-amino-2,4-dichlorobenzylmercaptan,
p-bromobenzylmercaptan,
o-bromobenzylmercaptan,
o-amino-benzylmercaptan,
3-amino-4-methoxybenzylmercaptan,
o-methylaminobenzylmercaptan,
p-methoxybenzylmercaptan,
4-methoxy-3-nitrobenzylmercaptan,
3,4-dimethoxybenzylmercaptan,
3,4-methylenedioxybenzylmercaptan are used in place of the methyl mercaptide, the corresponding 2-sulfide is obtained.

EXAMPLE 15

A mixture of 0.01 mole of 1-(2-cyanoethyl)-3-phenyl-2[1H]-pyridone, 50 ml. of acetic acid and 50 ml. of 10% sulfuric acid is refluxed for 4 hours. The reaction mixture is then concentrated, poured into water and extracted well with chloroform. The combined chloroform extracts are dried over sodium sulfate and concentrated to give 1-(2-carboxyethyl)-3-phenyl-2[1H]-pyridone.

EXAMPLE 16

A mixture of 0.01 mole of 1-(2-hydroxyethyl)-3-phenyl-2[1H]-pyridone and 25 cc. of concentrated hydrochloric acid is heated in a sealed tube for 60 hours at 120°. The reaction mixture is cooled and then concentrated in vacuo to yield 1 - (2 - chloroethyl) - 3 - phenyl-2[1H]-pyridone.

The following examples illustrate the interconversion or introduction of functional groups after preparation of the phenyl pyridone nucleus.

EXAMPLE 17

5-chloro-3-phenyl-2[1H]-pyridone 3-phenyl-2[1H]-pyridone (3.08 g.) and N-chlorosuccinimide (2.7 g.) are refluxed in methylene chloride (25 ml.) for 28 hours under a nitrogen atmosphere. Solution gradually occurs. After cooling, the mixture is filtered to remove succinimide, the filtrate diluted with ca. 20 more ml. $CH_2Cl_2$, washed with water (2×ca. 50 ml.), dried over magnesium sulfate, filtered, concentrated to 3.2 g. tan solid. Recrystallization from benzene (concentrating to ca. 40 ml. hot) yields 815 mg. very pale pink cotton-like crystals, M.P. 157.5–159°, of 5-chloro-3-phenyl-2[1H]-pyridone.

EXAMPLE 18

5-dimethylamino-3-phenyl-2[1H]-pyridone 5-chloro-3-phenyl-2[1H]-pyridone (1 g.) in anhydrous dimethylformamide (50 ml.) is saturated with dimethylamine, and the resultant mixture heated in a lined stainless-steel bomb for several hours. The solvent is removed in vacuo, the residue distributed between chloroform and water, the chloroform layer dried, solvent stripped, and the residue chromatographed on a silica gel column using a methanol-methylene chloride eluent (v./v. 0–100% MeOH) to yield the title compound.

EXAMPLE 19

3-p-hydroxyphenyl-2[1H]-pyridone 3-p-methoxyphenyl-2[1H]-pyridone (2 g.) is added to a stirred 10 g. portion of pyridine-hydrochloride at 188°. A dry nitrogen atmosphere is maintained. The mixture is kept 20 minutes, allowed to cool, then added to 45 g. of ice. The crude product is collected, dried and recrystallized to yield the title compound.

Similarly, when the o- and m-methoxyphenyl-pyridones are substituted for the p-isomer in the above reaction, the corresponding o- and m-hydroxy analogs are obtained.

EXAMPLE 20

3-(p-aminophenyl)-2[1H]-pyridone 3-(p-nitrophenyl)-2[1H]-pyridone (1 g.) in warm dioxane (50 ml.) is reduced under a hydrogen atmosphere in the presence of 0.3 g. 5% Pd/C. The mixture is filtered, the cake washed well with warm dioxane, the combined filtrates concentrated to residue, the residue recrystallized to yield title compound.

Alternately, when the dioxane solution is treated with anhydrous ethereal-hydrogen chloride solution, the hydrochloride precipitates. When the corresponding o-, and m-nitrophenyl-pyridones are used in the above reduction the o- and m-aminophenyl-pyridones are obtained.

EXAMPLE 21

3-(p-dimethylaminophenyl)-2[1H]-pyridone 3-(p-nitrophenyl)-2[1H]-pyridone (1 g.) in methanol (100 ml.) containing glacial acetic acid (1 ml.) and 37% formaldehyde solution (3 ml.) is reduced in the presence of Raney nickel (¼ tsp.) under a hydrogen atmosphere. The mixture is filtered, the cake washed with methanol, and the combined filtrates concentrated to a residue. Chromatography on an alumina column using a methanol-methylene chloride system (v./v. 0–100%) yields the title compound.

When the o- and m-nitro isomers are used in place of the p-isomer in the above reduction, the corresponding o- and m-dimethylaminophenyl-2-pyridones are obtained.

EXAMPLE 22

3-(p-carbamidophenyl)-2[1H]-pyridone 3-(p-cyanophenyl)-2[1H]-pyridone (5 g.) is added to a stirred ice-cold portion of concentrated sulfuric acid (20 g.) and the mixture stirred overnight, added to ice-water, the crude product collected, dried and recrystalized to yield the title compound. When the o- and m-cyanophenyl-pyridones are used in the above reaction, the corresponding o- and m-carbamidophenyl isomers are obtained.

EXAMPLE 23

3-(p-carboxyphenyl)-2[1H]-pyridone 3-(p-cyanophenyl)-2[1H]-pyridone (1 g.) in 30 ml. of a 1:1 mixture of glacial acetic acid—20% hydrochloric acid is heated for twelve hours, the solvent removed in vacuo, the residue partitioned between chloroform and nearly saturated sodium bicarbonate solution, the bicarbonate solution filtered and acidified, the precipitate collected, dried and recrystallized to yield the title compound.

When the o- and m-cyanophenyl-pyridones are used in the above reaction, the corresponding o- and m-carboxyphenyl isomers are obtained.

EXAMPLE 24

1-methyl-3-phenyl-2[1H]-pyridone-5-sulfonic acid

When 1-methyl - 3 - phenyl-2[1H]-pyridone is treated with chlorosulfonic acid according to the procedure of German Pat. 601,896, there is obtained 1-methyl-3-phenyl-2[1H]-pyridone-5-sulfonic acid.

EXAMPLE 25

3-phenyl-5-triphenylmethyl-2[1H]-pyridone 3-phenyl-2[1H]-pyridone (3 g.) and trityl chloride (3 g.) are intimately mixed and heated at ca. 250° in a metal-bath for 30 minutes, the reaction mixture cooled, and 60 ml. of boiling ethanol added, the solid filtered, washed with fresh ethanol, and recrystallized to give the title compound.

EXAMPLE 26

5-amino-3-phenyl-2[1H]-pyridone

When 5 - nitro - 3 - phenyl-2[1H]-pyridone is reduced under the conditions described in Example 20 above, the title compound is obtained.

When the 4- and 6-nitro isomers are used in place of the 5-nitro compound, the corresponding 4- and 6-amino-3-phenyl-2[1H]-pyridones are obtained.

EXAMPLE 27

5-dimethylaminomethyl-3-phenyl-2[1H]-pyridone 5-methyl-3-phenyl-2[1H]-pyridone (0.01 m.) and N-bromosuccinimide (0.01 m.) in carbon tetrachloride (250 ml.) are refluxed under irradiation for ca. 15 mins. (occasionally a trace of benzoyl peroxide is necessary to initiate reaction), cooled, filtered, and the filtrate concentrated in vacuo to a residue.

The residue is taken up in dimethylformamide, dimethylamine added, the vessel sealed and heated, the solvent removed in vacuo, and the residue chromatographed on an alumina column using a methanol-methylene chloride system (v./v. 0–100%) as eluent to yield the title compound.

Similarly, when the corresponding 4- and 6-methyl isomers are used in the above process, the corresponding 4- and 6-dimethylaminomethyl isomers are obtained.

EXAMPLE 28

3-(p-mercaptophenyl)-2[1H]-pyridone

The title compound is prepared from 3-(p-aminophenyl)-2[1H]-pyridone via the procedure of Tarbell & Fukushima for thiocresol (Org. Syn., Coll. vol. III, p. 809), but using chloroform as the organic extractant, omitting the 10% sodium hydroxide wash, and hydrolyzing the intermediate thiocarbonate under milder conditions. The mixture is then acidified, the solvent removed in vacuo, and the residue recrystallized, using deaerated solvents to avoid disulfide formation.

When the o- and m-aminophenyl isomers are used in place of the p-isomer in the above reaction, the corresponding o- and m-mercapto isomers are obtained.

EXAMPLE 29 p-(2[1H]-pyridon-3-yl)-benzenesulfonic acid

The procedure employed by Wallace (Tetrahydron Letters (1963) 1131) for benzene sulfonic acid is used.

3-(p-mercaptophenyl)-2[1H]-pyridone is stirred at room temperature in dimethylformamide containing potassium hydroxide (1.3 m.) under a partial oxygen atmosphere (1 atm.) for 24 hours. The mixture is acidified, the solvent removed in vacuo, and the residue recrystallized to yield p-(2[1H]-pyridon-3-yl)-benzene sulfonic acid.

Similarly, when the o- and m-mercaptophenyl isomers are used in the above procedure, the corresponding o- and m-sulfonic acids are obtained.

EXAMPLE 30 p-(2[1H]-pyridon-3-yl)-benzenesulfonamide p-(2[1H]-pyridon-3-yl)-benzenesulfonic acid (0.005 m.) is added to thionyl chloride (50 ml.) containing one drop of dimethylformamide. The mixture is stirred overnight at room temperature, the excess thionyl chloride removed in vacuo, dry benzene added, removed in vacuo, and the residue pumped out to remove all traces of thionyl chloride. The acid chloride is then taken up in anhydrous ether and added to an aqueous solution containing two equivalents of ammonia, allowed to stir for several hours, the product collected, dried, and treated as in Example 4B above to hydrolyze any 2-chloro derivative present. Recrystallization yields p-(2[1H]-pyridon-3-yl)-benzenesulfonamide.

When the o- and m-sulfonic acid isomers are used in the above reaction, the corresponding o- and m-sulfonamides are obtained.

When methylamine, dimethylamine or aniline is used in place of ammonia in the above reaction, the corresponding N-substituted sulfonamides are obtained.

EXAMPLE 31

2-acetoxy-3-phenyl-pyridine

A mixture of 0.01 mole of 3-phenyl-pyridine-N-oxide is refluxed for 12 hours in 50 cc. of acetic anhydride. Concentration of the reaction mixture in vacuo yields 2-acetoxy-3-phenyl-pyridine.

EXAMPLE 32

1-benzamido-3-phenyl-2[1H]-pyridone (A) To a mixture of 0.01 mole of 1-amino-3-phenyl-2[1H]-pyridone and 5.0 grams of anhydrous potassium carbonate in 100 mls. of chloroform is added portionwise with stirring 0.01 mole of benzoyl chloride. The reaction mixture is stirred for 4 hours at reflux, then cooled and filtered. The filtrate is concentrated in vacuo to yield 1-benzamido-3-phenyl-2[1H]-pyridone.

(B) When acetyl chloride is used in place of benzoyl chloride in the above example, there is obtained 1-acetamido-3-phenyl-2[1H]-pyridone.

(C) When carbobenzoxy chloride is used in place of benzoyl chloride in the procedure of part (A), 1-carbobenzoxyamino-3-phenyl-2[1H]-pyridone is obtained.

(D) When ethyl chloroformate is used in place of benzoyl chloride in the procedure of part (A), 1-carbethoxyamino-3-phenyl-2[1H]-pyridone is obtained.

(E) A mixture of 0.01 mole of 1-amino-3-phenyl-2[1H]-pyridone and 0.01 mole of benzaldehyde is refluxed for 3 hours in 30 mls. of ethanol. The reaction mixture is then concentrated to yield 1-benzylidineamino-3-phenyl-2[1H]-pyridone.

(F) To 0.01 mole of 1-amino-3-phenyl-2[1H]-pyridone in 100 mls. of anhydrous ether is added 0.01 mole of phenylisocyanate. The reaction mixture is refluxed for one hour, then concentrated to yield 1-(N'-phenylureido)-3-phenyl-2[1H]-pyridone.

EXAMPLE 33

3-(p-methylsulfinylphenyl)-2[1H]-pyridone 3-(p-methylmercaptophenyl) - 2[1H]-pyridone (0.001 mole) is stirred in methanol (50 ml.) and sodium metaperiodate (0.001 mole), dissolved in a minimum of water, is added. The mixture is stirred at room temperature for several days and then filtered. The filtrate is concentrated in vacuo and partitioned between chloroform and water. The chloroform layer is dried over sodium sulfate and the chloroform is removed in vacuo. The residue is recrystallized to yield the above compound.

When the o- and m-methylmercaptophenyl-pyridones are used in the above process, the corresponding o- and m-methylsulfinylphenyl-pyridones are obtained.

EXAMPLE 34

3-(p-methylsulfonylphenyl)-2[1H]-pyridone

To 3-(p-methylmercaptophenyl)-2[1H]-pyridone (1 g.) in glacial acetic acid (25 ml.) is added 30% aqueous hydrogen peroxide (2 ml.), and the resultant mixture is allowed to stir several days at room temperature. A minimum of sodium bisulfite is added to destroy the excess peroxide. The solvent is removed in vacuo and the residue is recrystallized to give the above compound.

When the o- and m-methylmercaptophenyl-pyridones are used in the above process, the corresponding o- and m-methylsulfonylphenyl-2[1H]-pyridones are obtained.

EXAMPLE 35

The testing procedures used are essentially those of (1) Winter, et al., Proc. Soc. Exper. Biol. 111, (1962), p. 544 (Carrogeenin-induced Foot Inflammation); (2) Stoerk et al., Am. J. Pathol. 30 (1954), p. 616 (Adjuvant Arthritis I); and (3) Newbould, Brit. J. Pharmacal. 24 (1965), p. 632 (Adjuvant Arthritis-II).

For example:

| | Dosage in mg./kg. Body Weight | | | | | |
|---|---|---|---|---|---|---|
| | Carrogeenin proc. | | Adj. Arthr. I | | Adj. Arthr. II | |
| Compound | Dose | Percent inhibit. | Dose | Percent inhibit. | Dose | Percent inhibit. |
| 3-phenyl-2[1H]-pyridone | 10 | 38 | 12.5 | 51.3 | 12.5 | 56.9 |
| 4-phenyl-2[1H]-pyridone | 100 | 54.7 | 12.5 | 55 | | |

What is claimed is:

1. A method of treating inflammation which comprises the oral administration to a patient of from 0.5 to 30 mg./kg. body weight/day of a compound, of the structure

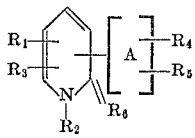

in which $R_1$ is hydrogen,
lower alkyl,
phenyl,
phenyl-lower alkyl,
halogen,
halo-lower-alkyl,
lower alkoxy,
amino,
diloweralkylamino,
diloweralkylamino loweralkyl,
or nitro;

$R_2$ is hydrogen,
loweralkyl,
loweralkenyl,
hydroxy,
amino,
loweralkynyl,
phenyl
benzamido,
loweralkanoylamino,
carbobenzoxyamino,
carb-loweralkoxyamino,
benzylidineamino,
phenylureido,
cyanoloweralkyl, or
carboxyloweralkyl;

$R_3$ is hydrogen, or
lower alkyl;

$R_4$ and $R_5$ are the same or different and are hydrogen,
loweralkyl,
phenyl,
halogen,
tripolo-loweralkyl,
loweralkoxy,
amino,
lower-dialkylamino,
nitro,
hydroxy,
cyano,
sulfamoyl,
mercapto,
lower alkylsulfinyl,
lower alkylsulfonyl,
carbamoyl, or
carboxy $R_6$ is oxygen;

and A is phenyl linked to the 3 position.

2. The method of claim 1 in which the compound is 3-phenyl-pyridone-2.

3. A method of treating inflammation which comprises the oral administration to a patient of from 0.5 to 30 milligrams per kilogram body weight per day of 4-phenyl-pyridone-2.

4. A method of treating inflammation which comprises the oral administration to a patient of from 0.5 to 30 mg./kg. body weight/day of a compound having the structure

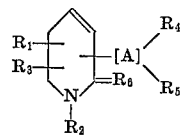

$R_1$, $R_2$, $R_3$, $R_4$ and $R_5$ are hydrogen, $R_6$ is oxygen and A is heterocyclic aryl selected from the group consisting of thiazoyl, thienyl or furyl and is linked to the 3 position.

References Cited

Chem. Abst. 55, 11957–b, 1961.
Chem. Abst. 54, 9955–c, 1960.
Chem. Abst. 60, 7990–d, 1964.
Chem. Abst. 64, 12573–b, 1966.

STANLEY J. FRIEDMAN, Primary Examiner